United States Patent [19]

Piedrafita

[11] Patent Number: 4,570,603
[45] Date of Patent: Feb. 18, 1986

[54] APPARATUS FOR IMPROVING GASOLINE CONSUMPTION, POWER AND REDUCING EMISSION POLLUTANTS OF INTERNAL COMBUSTION ENGINES

[76] Inventor: Roberto Piedrafita, 1818 S. Birch St., Santa Ana, Calif. 92707

[21] Appl. No.: 528,410

[22] Filed: Sep. 1, 1983

[51] Int. Cl.[4] ............................................. F02M 25/06
[52] U.S. Cl. .................................. 123/570; 123/572; 123/510; 123/1 A
[58] Field of Search ............... 123/572, 573, 574, 510, 123/511, 568, 556, 3, 1 A, 570; 48/189.1, 189.2; 60/278; 261/34 R, 69 R, 70

[56] References Cited

U.S. PATENT DOCUMENTS

| | | | |
|---|---|---|---|
| 595,552 | 12/1897 | Banki et al. | 123/556 |
| 3,329,137 | 7/1967 | Ferrell | 123/572 |
| 3,587,651 | 6/1971 | McCollough | 261/69 R |
| 3,664,313 | 5/1972 | Walker | 261/69 R |
| 3,669,423 | 6/1972 | Hohsho et al. | 261/69 R |
| 3,807,707 | 4/1974 | Johnson | 261/34 R |
| 3,846,980 | 11/1974 | De Palma | 123/572 |
| 3,918,412 | 11/1975 | Lindstrom | 123/3 |

Primary Examiner—Ira S. Lazarus
Assistant Examiner—R. S. Bailey
Attorney, Agent, or Firm—Ted De Boer

[57] ABSTRACT

An apparatus used in combination with a gasoline powered internal combustion engine. The apparatus allows a fuel-air inlet charge to be applied into the engine combustion chamber that is comprised of an optimized mixture of gasoline, air and unburned hydrocarbon exhaust gases. The apparatus is comprised of four elements that are synergistically combined with existing engine and engine-related components. The four elements include a thermic reactor, a catalytic gas injector, a thermic reactor exhaust filter, and a fuel regulator/restrictor. The thermic reactor supplies heated clean air and exhaust gases to the catalytic gas injector where the clean air and exhaust gases are mixed. The mixed gas together with a regulated quantity of gasoline supplied from the fuel regulator/restrictor are applied to the carburetor or fuel injection system. The fuel-air mixture improves the thermal efficiency of the engine, thereby reducing fuel consumption, and reducing air-contaminating exhaust emissions.

9 Claims, 11 Drawing Figures

APPARATUS FOR IMPROVING GASOLINE CONSUMPTION, POWER AND REDUCING EMISSION POLLUTANTS OF INTERNAL COMBUSTION ENGINES

TECHNICAL FIELD

This invention pertains to the general field of apparatuses that improve the fuel consumption and reduce emission pollutants from internal combustion engines. More particularly, the invention relates to apparatuses that direct and control quantities of exhaust gases and gasoline into an engine carburetor or fuel injection system.

BACKGROUND ART

The modern gasoline internal combustion engine is designed to operate at both low power (idle) or high power. To achieve this dual design parameter, it is necessary that a variable fuel-air ratio be used. For example, at idle it is necessary that the fuel-air mixture admitted as an inlet charge into the engine combustion chamber be relatively rich and significantly higher than the stoichiometric ratio of 0.067. While at higher power a leaner fuel-air mixture is required.

By admitting these rich mixtures under low power and part throttle operation of the engine there is a tendency to promote exhaust gases that are high in unburned hydrocarbons. These unburned hydrocarbons have a relatively high fuel energy content and can be burned in the engine to provide power that otherwise might be wasted. The underlying principle by which the instant invention operates is that the inventive apparatus allows there unburned hydrocarbons to be efficiently re-introduced into the intake manifold of the engine.

The prior art searched disclosed the following patents that although do not read directly on the invention are nevertheless related:

| U.S. PAT. No. | INVENTOR | ISSUED | |
|---|---|---|---|
| 4,279,236 | Dallman | 21 July | 1981 |
| 4,237,840 | Figueiras | 9 December | 1980 |
| 3,554,174 | Clawson | 12 January | 1971 |

The Dallman patent discloses an automotive fuel savings system that incorporates three individual air flow circuits. The first withdraws crankcase vapors and directs them through the air filter into the intake manifold; the second divides an air flow between the crankcase inlet orifice and the air filter; the third directs air into an area below the throttle plate in the carburetor. The three circuits function in combination to provide a crankcase ventilation system that allegedly results in improved engine efficiency and operation.

The Figueiras patent discloses a system for collecting and filtering gases and vapors produced in the exhaust manifold, crankcase transmission casing and the fuel tank of an internal combustion engine. These gases and vapors are then combined with fresh air and the mixture is supplied to the engine together with the fuel-air mixture from the carburetor to improve combustion.

The Clawson patent discloses an induction system for regulating the induction air inlet temperature of an internal combustion engine. Two induction circuits are employed: a throttle controlled ambient air circuit and a second inlet pressure regulated circuit that supplies air at elevated temperatures. The combined effect of the two circuits is to admit air to the engine in quantities that allows a satisfactory engine operation over a wide range at lean fuel-air ratios.

DISCLOSURE OF THE INVENTION

The apparatus is used in combination with a gasoline powered internal combustion engine to improve fuel consumption and to reduce air-contaminating exhaust emission. The apparatus functions by allowing some of the unburned hydrocarbons from the exhaust manifold and PCV valve to be applied, in combination with a regulated quantity of gasoline, to the engine carburetor or fuel injection system. The primary objective and advantage of the invention is that it allows an engine to consume less fuel under normal operating conditions. In an automobile, in both city and highway driving, the problem of fuel consumption has been extenuated with the advent of the energy shortage making this feature of great importance.

Another object provides fuel savings without a decrease in engine horsepower. This is obviously a distinct improvement over other prior art devices that provide fuel savings at the expense of power reduction. Yet, another object allows the system to provide a reduction of air-contaminating exhaust emissions. A further object allows the invention to be easily retrofitted into existing automobiles using gasoline internal combustion engines. Adaptors to interface with the carburetor, or the fuel injection system exhaust manifold are easily obtained, and/or fabricated and the apparatus is of a size that is compatible with the engine compartment of most vehicles. Further, this retrofit may be accomplished at reasonable expense as the components may be added without extensive modification to the engine or operating mechanisms. Obviously, the system may also be easily incorporated in newly designed vehicles. Still another object and advantage allows the apparatus to be used with any gasoline internal combustion engine regardless of the number of cylinders or block and piston arrangement. These and other objects and advantages of the present invention will become apparent from the subsequent detailed description of the preferred embodiment and the claims taken in conjunction with the accompanying drawings.

BRIEF DESCRIPTION OF THE DRAWINGS

The details of the invention are described in connection with the accompanying drawings in which.

BEST MODE FOR CARRYING OUT THE INVENTION

Figure 1:
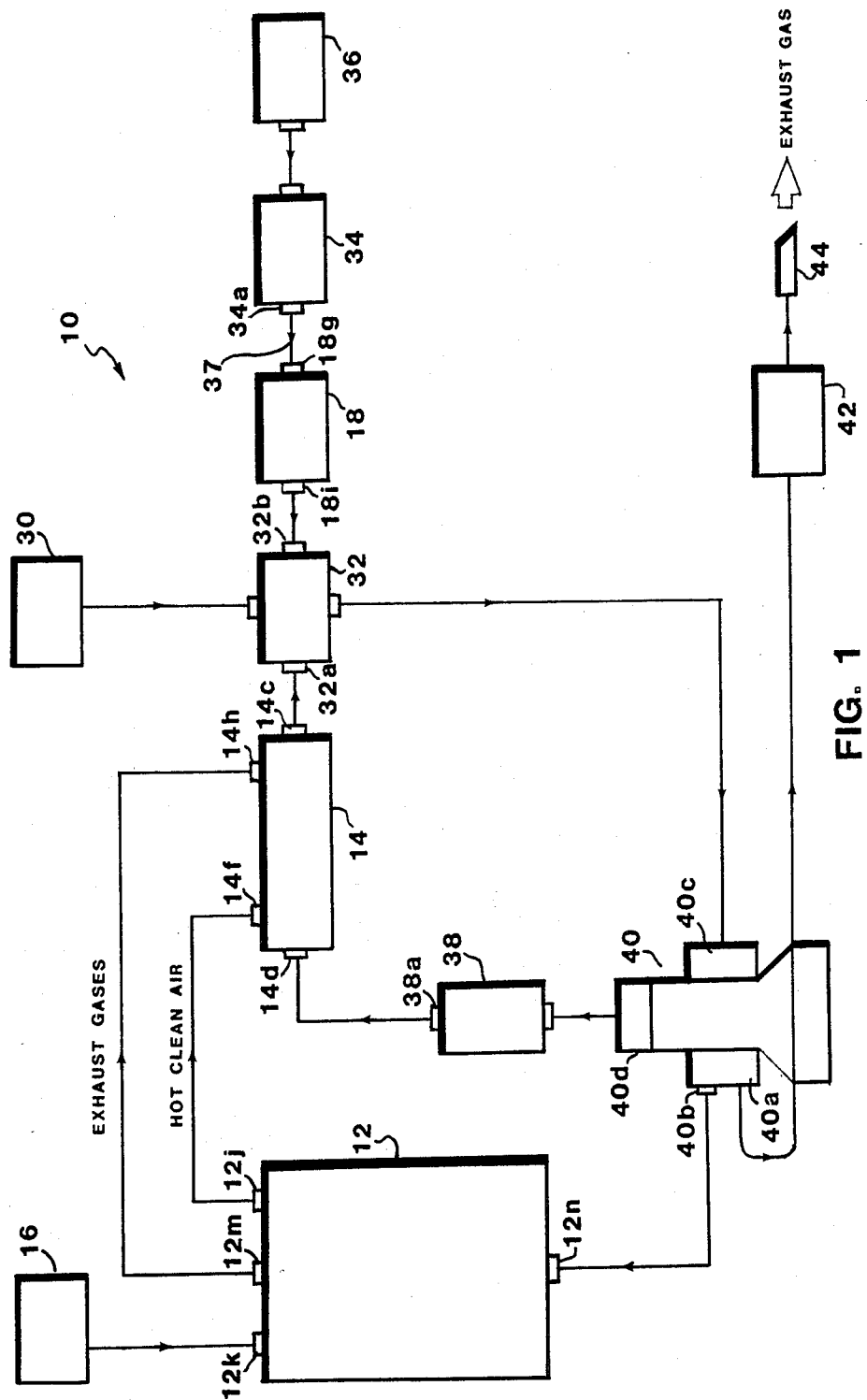
FIG. 1 is an overall schematic showing the elements of the apparatus interconnected with an engine employing a carburetor and other engine-related components.
Figure 2:
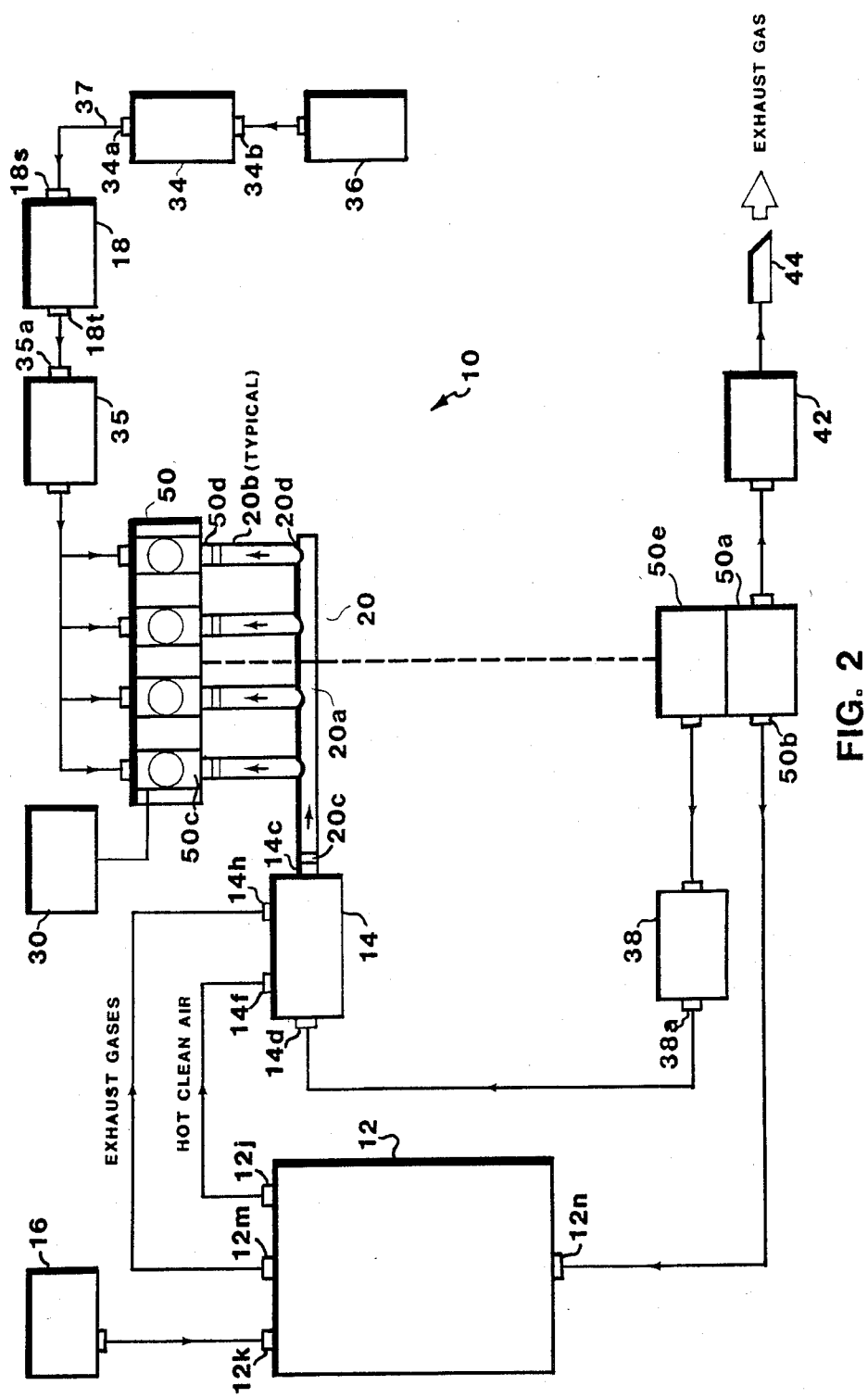
FIG. 2 is an overall schematic showing the elements of the apparatus interconnected with an engine using a fuel-injection system and other engine-related components.

The best mode for carrying out the invention, or the preferred embodiment, is shown in FIGS. 1 through 10. FIG. 1 schematically depicts the apparatus 10 as used with a gasoline powered internal combustion engine using a carburetor while FIG. 2 shows the apparatus connected to an engine having a fuel injection system. The apparatus 10 as used with an engine having a carburetor is essentially comprised of four elements: a thermic reactor 12, a catalytic gas injector 14, a thermic reactor air cleaner 16 and a fuel regulator/restrictor 18. For engines using fuel-injection, the apparatus 10 is also comprised of the above four elements plus a fuel-injection intake manifold adapter 20. These inventive elements are synergistically combined with existing engine and engine-related components to provide a cost-effective system that enhances the operation of an automobile.

The existing engine related components that are required and germane to the functioning and understanding of the apparatus 10, as shown in FIGS. 1 and 2 include: an air cleaner 30, a modified carburetor 32 (not used on the fuel injection system), a fuel pump 34, a fuel injection pump 35, a gasoline tank 36, a positive crankcase ventilation valve (PCV) 38, and an internal combustion engine 40 that requires a modification to the exhaust manifold or an engine 50 as used with a fuel injection system, that requires a modification to both the exhaust and intake manifolds. In the description, the numbering sequence 10–20 apply to the invention while the sequence 30–52 apply to existing as-is and modified components.

To facilitate the understanding of the invention, a description and the modifications required of the interfacing engine 40 or 50 and engine-related components 34, 35, 36 and 38 are initially described followed by a structural description of the inventive elements 12, 14, 16, 18 and 20. The invention elements and interfacing components are then connected and the operation of the apparatus 10 is described.

The carburetor 32 includes two modifications: the power valve is removed and the valve cavity is capped, and the main gasoline jets are removed and replaced with jets having an orifice of 0.00157 in. (0.04 mm). On carburetors having needle valves that operate in conjunction with a power valve it is also necessary that the needle valves be reduced in diameter to accommodate the smaller orifice.

On four-barrel carburetors having two forward main jets and two back jets, it is necessary that the back jets be removed and replaced with the forward jets and that the forward jets be replaced with jets having an orifice of 0.00157 in. (0.04 mm).

The fuel pump 34 and the gasoline tank 36 function normally with the exception that on carburetor equipped engines, the fuel line 37 from the fuel pump 34 to the carburetor 32 and on fuel injection engines, the fuel line 37 from the fuel pump 34 to the fuel injection pump 35 must be cut and fittings added to allow the fuel regulator/restrictor 18 to be connected in series between the carburetor 32 and fuel pump 34 or between the fuel pump 34 and the fuel injection pump 35 as shown respectively in FIGS. 1 and 2.

The modifications to the engine 40 require that the exhaust manifold 40a be drill and tapped to form a manifold exhaust port 40b. The engine 50 is also modified by drilling and tapping the exhaust manifold 50a to form a manifold exhaust port 50b. Additionally, each injection intake manifold 50c is drilled and tapped to form a series of catalytic gas injector input ports 50d. The muffler 42 and tailpipe 44 are not affected by the addition of the apparatus 10 and are only shown in FIGS. 1 and 2 to complete the engine exhaust system.

Figure 3:
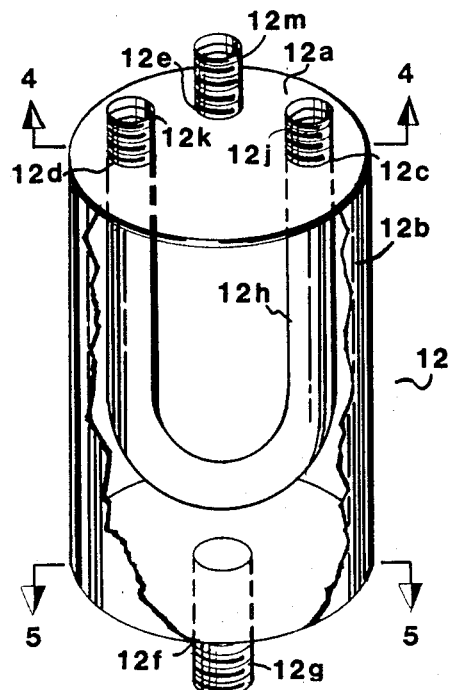
FIG. 3 is a partial cutaway isometric view of the thermic reactor.
Figure 4:
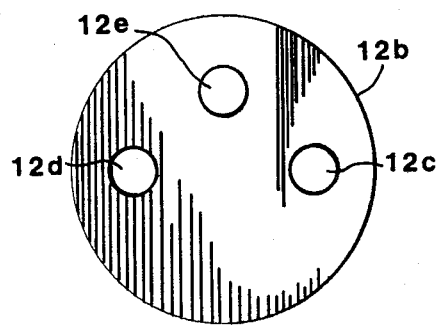
FIG. 4 is a sectional top view of the thermic reactor taken along lines 4—4 of FIG. 3.
Figure 5:
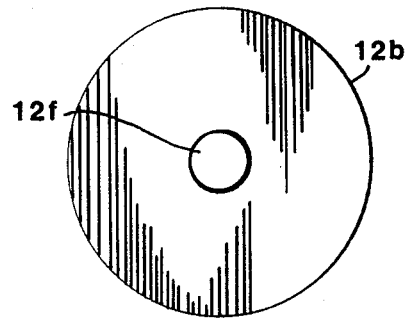
FIG. 5 is a sectional bottom view of the thermic reactor taken along lines 5—5 of FIG. 3.

The first inventive element described is the thermic reactor 12 as shown in FIGS. 3, 4 and 5. The thermic reactor consists of a hermetic enclosure having a length of 5.9 in. (150 mm) and a diameter of 2.0 in. (50.8 mm) and comprising a top cover 12a and a cup 12b. In the preferred embodiment both the top cover and cup were made of aluminum with the cup 12b having a wall thickness of 0.094 in. (2.4 mm). The top cover 12a as shown in FIG. 4 is also 0.094 in. thick (2.4 mm) and has three holes 12c, 12d and 12e each having a diameter of 0.375 in. (9.5 mm). The cup 12b has, on its bottom end, as shown in FIG. 5, a hole 12f that is threaded and sized to accept a standard 0.500 in. (12.70 mm) pneumatic male fitting 12g referred to as an engine exhaust input port 12n where the external end of the port 12g is threaded to directly fit into the manifold exhaust port 40b. Within the cup 12b is located a contiguous hollow tube 12h that, in the preferred embodiment has an inside diameter of 0.375 in. (9.525 mm), is made of copper or the like and is preferably, although not necessarily, U-shaped to allow a laminar flow of gas. The ends of the tube 12h extend above the lip of the cup and are inserted through two of the holes 12c, 12d on the top cover 12a to form a hot clean air exhaust port 12j and a clean air input port 12k respectfully. The two ports are threaded to accept a standard female hermetic fitting. The input port 12k is directly attached to the thermic reactor exhaust filter 16. The type and size of the exhaust filter 16 is not critical to the operation of the apparatus 10. The third hole 12e on the top cover is also threaded to accept a standard pneumatic male fitting to form an engine exhaust output port 12m. The male fitting attached to port 12m must have an insert that reduces the opening to 0.125 in. (3.2 mm).

To assure a hermetic enclosure the top cover 12a is subsequently welded to the top of the cup 12b with a welding material that is conductive to the material of the cup and top. Likewise, the ends of the tubes 12j, 12k, 12m are sealed, by an epoxy or the like, to their respective holes on the top cover 12a to preserve hermeticity.

Figure 6:
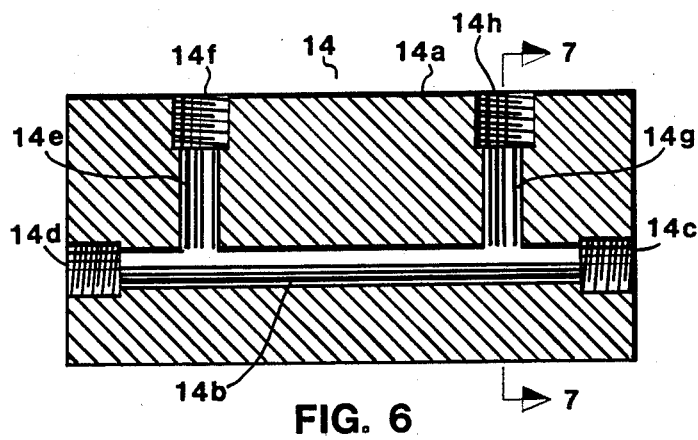
FIG. 6 is a side cutaway view of the catalytic gas injector.
Figure 7:
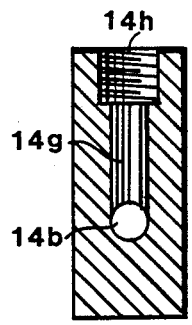
FIG. 7 is a sectional common side view of the catalytic gas injector taken along lines 7—7 of FIG. 6.

The catalytic gas injector 14, as shown in FIGS. 6 and 7, is comprised of a rectangular solid block 14a that in the preferred embodiment is made of aluminum. The block has a length of 3.0 in. (76.2 mm), a height of 2.0 in. (50.8 mm) and a width of 0.6 in. (15.2 mm). Along the length and extending through the block, there is a horizontal bore 14b having a diameter of 0.315 in. (8.0 mm). The bore 14b as viewed from the end of the block, is centrally located near the bottom half of the block 14a as shown in FIG. 6. One end of the bore 14b serves as a catalytic gas output port 14c while the other end serves as a PCV input port 14d. Both ports are threaded to allow a standard pneumatic male fitting to be attached.

However, the pneumatic male fitting attached to the PCV input port has an opening of 0.125 in. (3.2 mm).

The block 14a also has a first vertical bore 14e and a second vertical bore 14g. The vertical designation of the bores 14e, 14g is in reference to the horizontal bore 14b. Both bores are of identical diameter as that of the horizontal bore 14b and commence from the edge of the block 14a that is furthest from the horizontal bore. The first vertical bore 14e is centrally located on the first third of the block 14a and is coterminus with the horizontal bore 14b as best shown in FIG. 6. Likewise, the second vertical bore 14g is centrally located on the last third of the block and is also coterminus with the horizontal bore 14b. The first vertical bore 14e serves as a hot clean air input port 14f and the second vertical bore 14g serves as an engine exhaust input port 14h. Both vertical ports are also threaded to allow a standard pneumatic male fitting to be attached.

As an alternate construction scheme, the catalytic gas injector (not shown) may be comprised of a tube assembly consisting of a horizontal tube and two vertical tubes. One end of the horizontal tube serves as the catalytic gas output port while the other end as the PCV input port. The horizontal tube has two in-line openings to which each opening is rigidly attached a vertical tube having a diameter equal to the diameter of the horizontal tube. One of the vertical tubes serves as the hot clean air input port and the other as the engine exhaust input port. The entire tube assembly is encased in a holding structure where each of the ports protrudes outside the structure. Each port is threaded to allow a standard pneumatic fitting to be attached.

Figures 8, 9, 10:
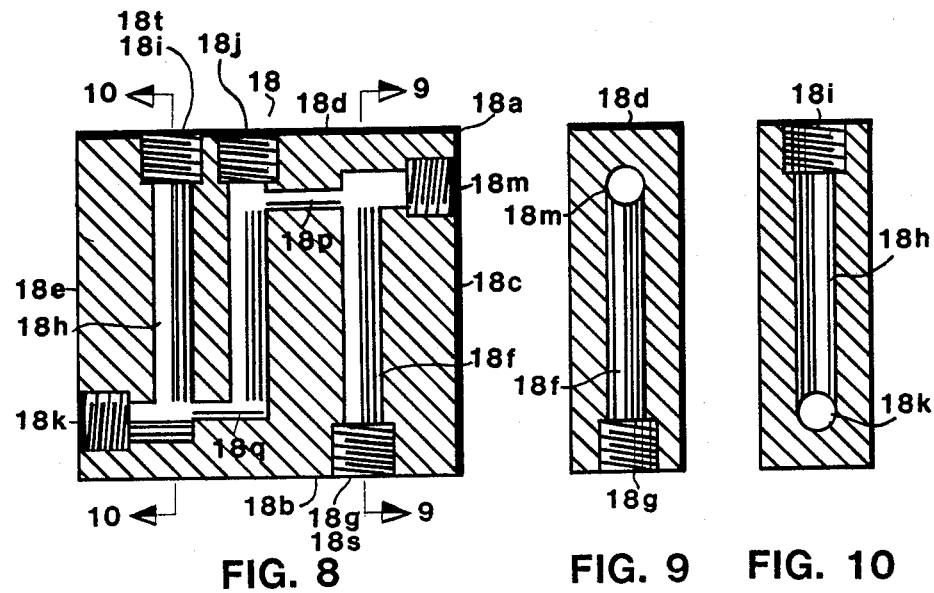
FIG. 8 is a side cutaway view of the gasoline regulator/restrictor.
FIG. 9 is a sectional right-side view of the gasoline regulator/restrictor taken along lines 9—9 of FIG. 8.
FIG. 10 is a sectional left-side view of the gasoline regulator/restrictor taken along lines 10—10 of FIG. 8.

The fuel regulator/restrictor 18, as shown in FIGS. 8, 9 and 10 is comprised of a solid block 18a that in the preferred embodiment is constructed of metal, with aluminum preferred. The block measures 2 in. (50.8 mm) by 2 in. (50.8 mm) and is 0.609 in. (15.5 mm) wide. The restrictor 18, as shown in FIGS. 8 and 9, has along a center line on its bottom side 18b near the right side 18c a first vertical bore 18f having a diameter of 0.250 in. (6.350 mm). This first bore, as referenced in FIG. 1, serves as the fuel pump input port 18g and is threaded, as best shown in FIG. 9, to allow a standard pneumatic male fitting having an orifice of 0.125 in. (3.2 mm) to be attached. Along a center line on its upper side 18d near the left side 18e is second vertical bore 18h having a diameter equal to that of the first vertical bore 18f. The second bore serves as the carburetor output port 18i and is also threaded as best shown in FIG. 10, to receive a standard male pneumatic fitting having an orifice of 0.250 in. (6.350 mm). In parallel between the first vertical bore 18f and the second vertical bore 18h, as best shown in FIG. 8, is located a vertical capped cavity 18j. On the left side 18e near the bottom is located a first horizontal capped cavity 18k and on the right side 18c near the top is located a second horizontal capped cavity 18m.

The internal configuration of the two vertical bores/ports and the three cavities, as shown in FIG. 8, is such that the first vertical bore 18f extends in an upwardly direction and continues until an internal 90-degree contiguous connection is made with the internal end of the second capped cavity 18m. The diameter of this and all other subsequent cavities described is identical to that of the two vertical bores. The second vertical bore 18h extends in a downwardly direction and continues until an internal 90-degree contiguous connection is made with the internal end of the first capped cavity 18k.

The internal pneumatic connection between the fuel pump inlet port 18g and the carburetor output port 18i is made via the vertical capped cavity 18j which functions as a pneumatic transfer cavity. This cavity has internally a first flow restrictor tube 18p and a second flow restrictor tube 18q. The first tube 18p is horizontally oriented and is attached in-line/centered with the second horizontal capped cavity 18m and intersects the vertical capped cavity 18j near its top as best shown in FIG. 8. The second flow restrictor tube 18q is a contiguous 90-degree extension of the vertical capped cavity 18j. The extension occurs at the bottom of the cavity where the restrictor tube 18q is in-line with the diameter-center of the first horizontal capped cavity 18k. Thus, the pneumatic connection is made via the fuel pump inlet port 18g, the first flow restrictor tube 18p, the second flow restrictor tube 18q and the carburetor output port 18i. The diameter of the two restrictor tubes is 0.125 in. (3.2 mm).

Figure 11:
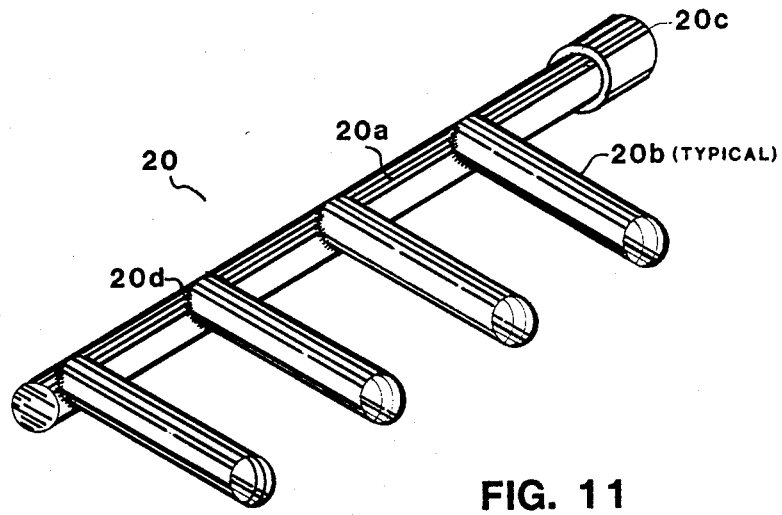
FIG. 11 is an isometric view of the fuelinjection intake manifold adapter.

The final element described is the fuel-injection intake manifold adapter 20. This element, as best shown in FIG. 11, is comprised of a horizontal tube 20a and a plurality of vertical tubes 20b. The quantity of vertical tubes is dependent upon the number of engine cylinders. For example, the adapter shown in FIGS. 2 and 11 is applicable to a four cylinder engine. The horizontal tube 20a has on one end a gas input port 20c that connects to the catalytic gas output port 14c located on the catalytic gas injector 14. The other end of the tube 20a is hermetically capped. The tube 20a has in-line and on one side a plurality of vertical tube bores 20d.

One end of the vertical tubes 20b is rigidly attached and is coterminus with its corresponding vertical tube bore 20d. The other end of the vertical tube is hermetically attached, by conventional means, to the corresponding catalytic gas injector input port 50d on the injection intake manifold 50c of the engine 50 as shown in FIG. 2. All tubes are made of copper and each tube has an inside diameter of 0.313 in. (8 mm).

The connections between the apparatus 10 and a carburetor equipped engine and engine related components are shown in FIG. 1. The thermic reactor 12 has two inputs and two outputs. The two inputs are the engine exhaust input port 12n that is threaded directly into the manifold exhaust port 40b located on the engine exhaust manifold 40a, and the clean air input port 12k connected directly to the thermic reactor exhaust filter 16. The two outputs include the hot clean air exhaust port 12j and the engine exhaust output port 12m that are respectively connected to the hot clean air input port 14f and the engine exhaust input port 14h both of which are located on the catalytic gas injector 14.

The catalytic gas injector 14 in addition to the two inputs from the thermic reactor has a third input port 14d. This port is connected to the PCV output port 38a on the PCV valve 38 which in turn is normally connected to the valve lifter cover 40d or 50e on the engine 40 or 50 respectively. On the engines not using a PCV valve, the PCV input port 14d is capped.

The output of the catalytic gas injector 14 is from the catalytic gas output port 14c which is connected to the catalytic gas input port 32a on the carburetor 32 which is where the PCV valve 38 is normally connected. The carburetor 32 which is normally connected to the intake manifold 40c also has two other inputs: the clean air filter 30 which is connected to the carburetor throat and the fuel regulator/restrictor input port 32b which connects to the carburetor output port 18i located on the regulator/restrictor 18. The input port 32b is not modified to accept the output port 18i. The input to the flow regulator/restrictor 18 is applied through the fuel pump inlet port 18g from the fuel pump 34. The fuel pump is connected normally to the gasoline tank 36.

The connections between the apparatus 10 and a fuel injected engine 50 and other engine-related components are shown in FIG. 2. The description commences from the output of the catalytic gas injector 14 since all other elements are connected in a similar manner as previously described with the exception that the fuel regulator/restrictor 18 is connected in series between an electric fuel pump 34 and the fuel injection pump 35, where, as shown in FIG. 2, the fuel pump output port 34a is connected to the fuel pump input port 18s and the fuel injection output port 18t is connected to the fuel injection pump input port 35a. The output of the fuel injection pump is conventionally connected to the fuel injection system of the engine 50. The output port 14c of the catalytic gas injector is connected to the gas input port 20c of the fuel-injector intake manifold adapter 20. The individual vertical tubes 20b are then each conventionally connected to their corresponding catalytic gas injector input port 50d on the intake manifold 50c of the engine 50.

Operation—To achieve the optimum operating efficiency from the apparatus 10 it is necessary that the engine be properly tuned and operated with the design octane level of gasoline. In general, the engine must be in a good operating condition and the air filters changed every 10,000 miles. Additionally, all pneumatic connections must be hermetic and free of tube kinks.

The apparatus performs at its optimum when the engine reaches its normal "hot engine" operating temperature. At this point the engine is at is peak operating efficiency and the apparatus, the engine and engine related components have reached a temperature equilibrium.

The apparatus is explained in terms of its use with an engine employing a carburetor. However, the essence of the description is also applicable to fuel injected engines. The operation begins when the hot exhaust gases from the exhaust manifold are applied to the engine exhaust input port 12n on the thermic reactor 12. At the same time clean ambient air is applied into the clean air input port 12k via the thermic reactor air cleaner 16 and is exhausted out of the hot clean air exhaust port 12j into the catalytic gas injector 14. The injector 14 also receives exhaust gases which are applied from the engine exhaust output port 12m and from the PCV valve 38.

At this point in the discussion it should be understood that the exhaust gases in internal combustion engines consist of two major components: the blow-dry gases i.e., the carbureted mixture plus exhaust gases passing by the rings of the piston and vaporized and entrained particles of the lubricating oils in the crankcase that have been aerified or vaporized due primarily to agitation. The blow-by gases contain large quantities of hydrocarbon gases that have a relatively high fuel energy content and can be burned in the engine to provide power that might otherwise be wasted. These energy latent gases are utilized in the apparatus.

The hot exhaust gases are dispersed within the thermic reactor 12 and function, in part, to heat the clean air from the air filter 16. The hot clean air and the exhaust gases from the exhaust manifold and the PCV valve are mixed within the catalytic gas injector 14. The injector 14 then applies the heated mixed gases to the carburetor 32.

The carburetor 32 receives the mixed gases from the catalytic gas injector 14, normal clean air from the air cleaner 30, and a measured amount of gasoline from the fuel regulator/restrictor 18. The regulator/restrictor 18 is designed with a series of ports, cavities and restriction passages that passively function in combination to allow the element to maintain a reasonably constant gasoline output regardless of the engine power level. Thus, the richness or leanness of the fuel-air mixture varies and is primarily controlled by the amount of gases supplied to the carburetor from the catalytic injector 14.

The apparatus is thus designed to operate efficiently at both an idle condition and at full power, for example, at idle or minimum power operation it is necessary that a relatively rich fuel-air ratio that is significantly higher than the stoichiometric ratio of 0.067 be admitted as an inlet charge while at full power the fuel-air ratio is leaner. These two conditions are satisfied by the combination of (A) the variable amount of hot gas supplied to the carburetor from the catalytic gas injector 14, (B) the regulated gas supplied to the carburetor from the fuel regulator/restrictor 18 and (C) by using a carburetor that is optimized for use with the apparatus.

Although the invention has been described in complete detail and pictorally shown in the accompanying drawings, it is not to be limited to such details since many changes and modifications may be made to the apparatus for improving gasoline consumption, power and reducing emission pollutants of internal combustion engines without departing from the spirit and scope thereof. Hence, the invention is described to cover any and all modifications and forms which may come within the language and scope of the claims.

I claim:

1. An apparatus for improving performance and reducing fuel consumption and emission pollutants from an internal combustion gasoline engine comprising:
    (a) an internal combustion gasoline engine having, in part, an intake manifold and an exhaust manifold where the exhaust manifold is modified to include a manifold exhaust port,
    (b) a modified internal combustion engine carburetor connected to the intake manifold on said engine and
        (1) removal of the power valve and capping the power valve cavity, and
        (2) reducing the diameter of the main gasoline jets,
    (c) a positive crankcase ventilation valve (PCV) having an input port conventionally connected to said internal combustion engine and also having a PCV output port,
    (d) an automobile fuel pump having an input connected to a conventional fuel tank and having a fuel pump output port,
    (e) a thermic reactor comprising a hermetic enclosure housing a contiguous hollow tube shaped to provide a laminar flow of gas, with the tube having a clean air input port on one terminating end and having a hot clean air exhaust port on the other terminating end with said thermic reactor also having an engine exhaust input port, and an engine exhaust output port, and where the engine exhaust input port is pneumatically connected to the manifold exhaust port on the exhaust manifold of said engine, (f) a thermic reactor air cleaner pneumatically connected to the clean air input port on said thermic reactor, (g) a catalytic gas injector comprised of a rectangular solid block having along the length and extending through the block a horizontal bore centrally located on the upper half of the block as viewed from the end of the block where one end of the horizontal bore serves as a catalytic gas output port that is pneumatically connected to the catalytic gas input port on saic carburetor and where the other end is a PCV input port that is connected to the PCV output port of said PCV valve, with the block also having a first vertical bore and a second vertical bore where both vertical bores are of identical diameter as that of the horizontal bore and commence from the edge of the block furthest from the horizontal bore where both bores are coterminus with the horizontal bore and where the first vertical bore serves as a hot clean air input port that is connected to the hot clean air exhaust port on said thermic reactor and where the second vertical bore serves as an engine exhaust input port that is connected to the engine exhaust output port on said thermic reactor, and (h) a fuel regulator/restrictor comprised of a solid block having a fuel pump input port and a carburetor output port, where the two ports are internally and pneumatically connected by means of a novel plurality arrangement of vertical bores, capped cavities and flow restrictor tubes, where the fuel pump input port is pneumatically connected to the fuel pump output port and where the carburetor output port is pneumatically connected to the conventional gasoline input port on said carburetor.

2. The apparatus as specified in claim 1 wherein the hermetic enclosure of said thermic reactor is comprised of a cup sized to house the contiguous hollow tube and a top cover having three holes where from two of the holes protrudes the two ends of the hollow tube to form the clean air input port and the hot clean air exhaust port and from the third hole is attached a small tube section to form the engine exhaust output port, and where the top cover is hermetically attached to the top of the cup.

3. The apparatus as specified in claim 1 wherein the rectangular solid block of said catalytic gas injector is made of a metal.

4. The apparatus as specified in claim 1 wherein said catalytic gas injector is comprised of a tube assembly consisting of a hollow horizontal tube having on one end a catalytic gas output port and having in the other end a PCV input port and with the horizontal tube having two in-line openings having attached to each opening a vertical tube having a diameter equal to the diameter of the horizontal tube where one vertical tube serves as the hot clean air input port and the other vertical tube as the engine exhaust input port and where the tube assembly is encased in a holding structure having the ports exposed.

5. The apparatus as specified in claim 1 wherein said fuel regulator/restrictor is comprised of a solid block having on its bottom side near the right side a first vertical bore serving as a fuel pump input port that is pneumatically connected to the fuel pump output port on said fuel pump and having on its upper side near the left side a second vertical bore serving as a carburetor output port that is penumatically connected to the conventional gasoline input port of said carburetor, with the block also having in-line between the first vertical bore and the second vertical bore a vertical capped cavity and having on its left side near the bottom a first horizontal capped cavity and on the right side near the top having a second horizontal capped cavity, where the internal pneumatic connection between the fuel pump inlet port and the carburetor output port is made by a first flow restrictor tube horizontally connected between the first vertical bore and one side of the vertical capped cavity and a second flow restrictor tube horizontally connected between the other side of the vertical capped cavity and the second vertical bore.

6. An apparatus for improving performance and reducing fuel consumption and emission pollutants from an internal combustion gasoline engine comprising:

(a) an internal combustion gasoline engine having, in part, a fuel-injection system employing an intake manifold that is modified by having at each cylinder position a catalytic gas injector input port, (b) a positive crankcase ventilation valve (PCV) having an input port conventionally connected to said internal combustion engine and also having a PCV output port, (c) a fuel injection pump having an output port connected to the fuel injection input on the intake manifold of said engine and having a fuel injection pump input port, (d) an automobile electric fuel pump connected to a gasoline tank and having a fuel pump output port, (e) a thermic reactor comprising a hermetic enclosure housing a contiguous hollow tube shaped to provide a laminar flow of gas, with the tube having a clean air input port on one terminating end and having a hot clean air exhaust port on the other terminating end with said thermic reactor also having an engine exhaust input port, and an engine exhaust output port, and where the engine exhaust input port is pneumatically connected to the manifold exhaust port on the exhaust manifold of said engine, (f) a thermic reactor air cleaner pneumatically connected to the clean air input port on said thermic reactor, (g) a catalytic gas injector comprised of a rectangular solid block having along the length and extending through the block a horizontal bore centrally located on the upper half of the block as viewed from the end of the block where one end of the horizontal bore serves as a catalytic gas output port and where the other end is a PCV input port that is connected to the PCV output port of said PCV valve, with the block also having a first vertical bore and a second vertical bore where both vertical bores are of identical diameter as that of the horizontal bore and commence from the edge of the block furthest from the horizontal bore where both bores are coterminus with the horizontal bore and where the first vertical bore serves as a hot clean air input port that is connected to the hot clean air exhaust port on said thermic reactor and where the second vertical bore serves as an engine exhaust input port that is connected to the engine exhaust output port on said thermic reactor, (h) a fuel-injection intake manifold comprising:

(1) a horizontal tube having in-line on one side a plurality of vertical bores and where one end of the tube serves as a gas input port that is pneumatically connected to catalytic gas output port on said catalytic gas injector and where other end of the tube is hermetically capped;

(2) a plurality of vertical tubes where one end of the tube is rigidly attached and is coterminus with each of the plurality of bores and where the other end of each vertical tube is pneumatically attached to the corresponding catalytic gas injector input port on said intake manifold, and (i) a fuel regulator/restrictor comprised of a solid block having a fuel pump input port and a fuel injection pump output port where the two parts are internally and pneumatically connected by means of a novel plurality arrangement of vertical bores, capped cavities, and flow restrictor tubes, where the fuel pump input port is pneumatically connected to the fuel pump output port on said electric fuel pump and where the fuel injection pump output port is pneumatically connected to the fuel injection pump input port on said fuel injection pump.

7. The apparatus as specified in claim 6 wherein the hermetic enclosure of said thermic reactor is comprised of a cup sized to house the contiguous hollow tube and a top cover having three holes where from two of the holes protrudes the two ends of the hollow tube to form the clean air input port and the hot clean air exhaust port and from the third hole is attached a small tube section to form the engine exhaust output port, and where the top cover is hermetically attached to the top of the cup.

8. The apparatus as specified in claim 6 wherein the rectangular solid block of said catalytic gas injector is made of aluminum.

9. The apparatus as specified in claim 6 wherein said fuel regulator/restrictor is comprised of a solid block having on its bottom side near the right side a first vertical bore serving as a fuel pump input port that is pneumatically connected to the fuel pump output port on said electric fuel pump and having on its upper side near the left side a second vertical bore serving as a fuel injection pump output port that is pneumatically connected to the fuel injection pump input port on said fuel injection pump, with the block also having in-line between the first vertical bore and the second vertical bore a vertical capped cavity and having on its left side near the bottom a first horizontal capped cavity and on the right side near the top having a second horizontal capped cavity, where the internal pneumatic connection between the fuel pump inlet port and the carburetor output port is made by a first flow restrictor tube horizontally connected between the first vertical bore and one side of the vertical capped cavity and a second flow restrictor tube horizontally connected between the other side of the vertical capped cavity and the second vertical bore.

* * * * *